Patented Aug. 11, 1953

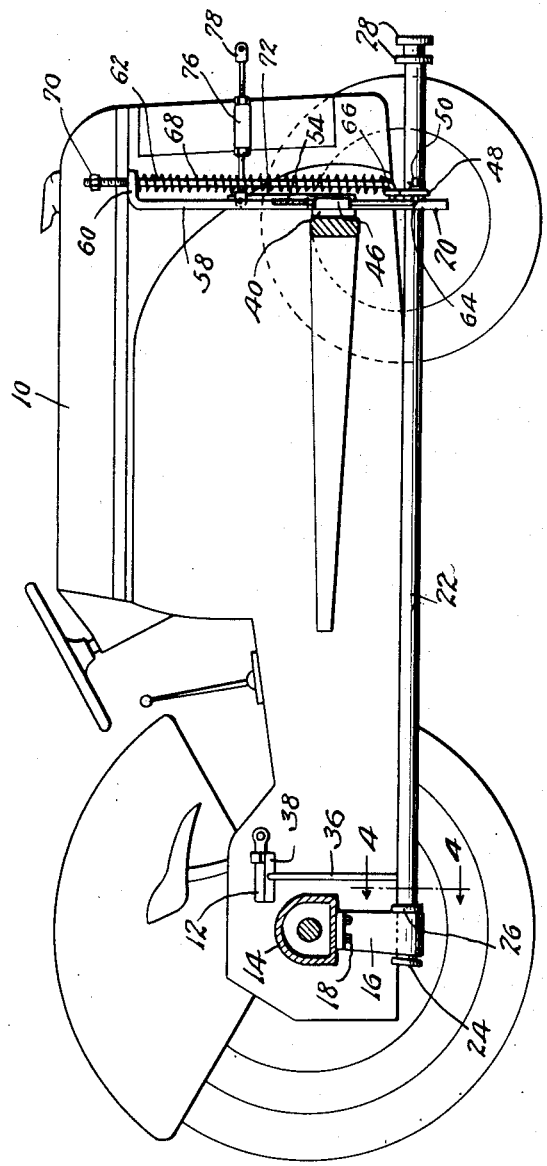

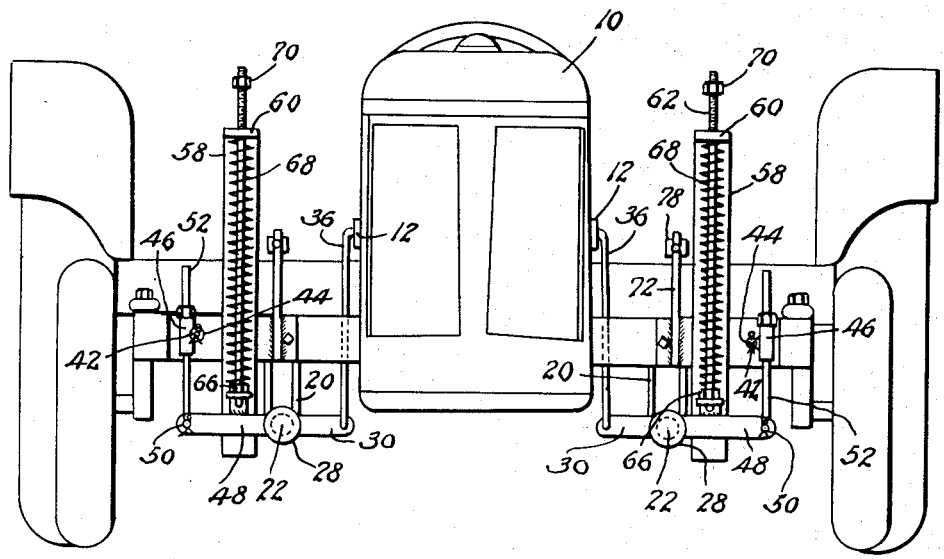
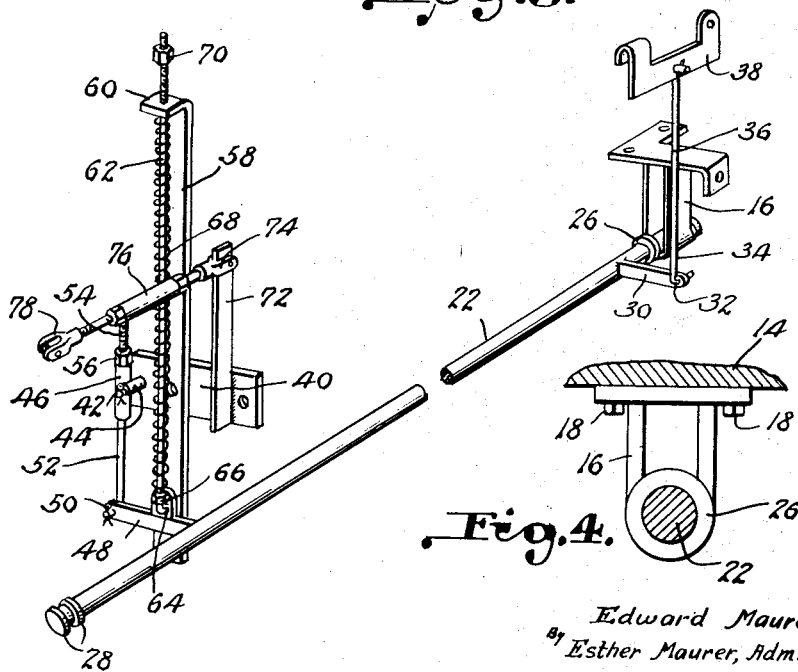

2,648,269

UNITED STATES PATENT OFFICE 2,648,269

MEANS FOR COUPLING FARMING IMPLEMENTS TO CONVENTIONAL FARM TRACTORS ADJACENT THE FORWARD END THEREOF

Edward Maurer, deceased, late of Freeland, Mich., by Esther Maurer, administratrix, Freeland, Mich.

Application March 26, 1952, Serial No. 278,574

10 Claims. (Cl. 97—47.35)

This invention relates to attachments connectible to tractors or the like, for permitting attachment, to the front of the tractor, of such implements as bean pullers, cultivators, and the like.

The primary object of the invention is to provide an attachment of the type stated that is capable of ready manufacture as a separate device, that is readily mounted upon a tractor without in any way affecting the conventional construction of the tractor, or the manner of operation of the tractor itself and its hydraulic lifting means.

It is well known that tractors of the type on which the attachment comprising the invention is mounted, require the attachment of implements such as bean pullers and cultivators on the rear of the tractor. This has not been found to be entirely satisfactory, and it has been recognized that implements of this and related types are capable of more efficient operation when attached to the front of the tractor. However, the designing of a hitch whereby this aim is achieved, with the proper motion yet being given to the implements stated, presents a number of problems. An important object of this invention, therefore, is the solution of such problems, by the provision of a proper tractor hitch or attachment especially designed to permit efficient operation of separate implements connectible to the hitch at the front of the tractor.

A further important object of the invention is to provide a device of the character described that is capable of construction at a minimum of expense, without the necessity of expensively machined parts, and which will yet be extremely durable and capable of use over a long period of time, these being very essential requisites in a device of this type.

Another important object of the invention is to provide such a hitch, without the necessity of devising separate special controls for the operation of the hitch, my invention being adapted for operation with no additional controls required beyond the usual hydraulic finger-tip control embodied in tractors of conventional construction.

Still another important object is to provide a hitch of this type so designed as to impart to the implements connectible thereto an action or motion adapted to permit unusually efficient operation of said implements.

Still another object is to provide a device of this type wherein means are embodied permitting ready and quick adjustment and connection of various types of implements to the hitch.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawings,

Figure 1 is a side view in elevation of my attachment, the attachment being shown mounted upon a tractor, with the wheels on one side of the tractor being removed for the purpose of showing the device clearly, the attachment illustrated being one of two identical attachments, one for each side of the tractor, Figure 2 is a front elevational view of a tractor equipped with an implement hitch embodying the features of this invention, Figure 3 is a perspective view of one of the identical devices removed from the tractor, and, Fig. 4 is a fragmentary enlarged sectional view taken substantially on the line 4—4 of Figure 1.

Referring to the drawings in detail, a tractor of conventional construction designated generally 10 is provided adjacent its rear end with conventional hydraulic lift arms 12 which are interconnected for simultaneous movement in spaced vertical arcs on opposite sides of the tractor.

Secured to and depending from the rear axle housing 14 of the tractor 10 adjacent opposite sides of said tractor are depending U-shaped brackets 16 which may be attached to the axle housing 14 by conventional bolts 18. Depending U-shaped brackets 20 are similarly mounted on the frame of the tractor 10 adjacent the forward end thereof and the front and rear brackets 16 and 20 on each side of the tractor register to provide hangers in which the push bars to be more fully hereinafter described are movably supported.

Mounted in the registering brackets 16 and 20 on opposite sides of the tractor are elongated longitudinally extending push bars 22 which extend substantially parallel to one another along opposite sides of the tractor 10 and are provided adjacent their rear ends with heads 24 which engage the rear edges of the yokes or brackets 16 to prevent longitudinal movement of the push bars 22 relative to the tractor 10 in one direction. Stop collars 26 are carried by the push bars 22 adjacent the forward edges of the depending yokes or brackets 16 to prevent material longitudinal movement of the push bars relative to the tractor 10 in the opposite direction.

As illustrated in Fig. 1, the push bars 22 are extended through the brackets 20 so that when the push bars are at rest they lie along substantially horizontal spaced parallel axes which in turn lie parallel with but on opposite sides of the longitudinal axis of the tractor. Carried by the push bars adjacent the forward ends thereof are longitudinally spaced outwardly extending annular collars 28 between which are received the coupling elements of a farming implement which is to be connected to the tractor for movement thereby. Carried by and extending latterally from each push bar 22 adjacent the collar 26 is a rock arm 30 which extends toward the body of the tractor 10 and is provided remote from its respective push bar with an opening 32 for the reception of the hooked end 34 of a link 36 which extends upwardly and is pivotally connected to a yake 38 which is removably coupled to a lift arm 12 for movement therewith in a vertical arcuate path. It will thus be seen that as the lift arms 12 are moved in their vertical arcuate paths, the push rods 22 will be rocked about their longitudinal axes, and since the arms 12 move in unison, the rocking movement imparted to the push bars 22 will be of equal magnitude.

Mounted on the frame of the tractor 10 adjacent the forward end thereof and above the yokes 20 are horizontally extending plates 40 carrying forwardly extending horizontal pins 42 on which are mounted for rocking movement sleeves 44. The pins 42 lie parallel to the longitudinal axis of the tractor and carried by the sleeves 44 are tubular guide members 46, the axes of which lie perpendicular to the axes of the sleeves 44. It will thus be seen that the tubular guide members 46 may rock about the axes of the pins 42 in spaced arcuate paths which lie perpendicular to the longitudinal axis of the tractor 10. Carried by and extending laterally from each push bar 22 adjacent the forward end thereof is a fulcrum arm 48 which is pivotally connected remote from its respective push bar 22 as at 50 to a suspension arm 52 which extends upwardly through an adjacent guide sleeve 46 and is externally screw threaded as at 54 for cooperation with an adjusting nut 56 by means of which the pivotal junction of the fulcrum arm 48 with the suspension rod 52 may be vertically adjusted. It will thus be seen that as the push bars 22 are rocked about their longitudinal axes by the movement of the lift arms 12, the ends of the push bars 22 adjacent the yokes 20 may move about the axis of the pivotal connection 50 to cause the forward ends of the push bars to be moved upwardly within the brackets or yokes 20, and since the suspension bars 52 are pivotally supported on the pins 42 it is obvious that the sleeves 46 and suspension rods 52 will swing inwardly toward the tractor as the push bars 22 move upwardly in the yokes 20.

Secured to each plate 40 intermediate the ends thereof is a vertically extending column 58 carrying adjacent its upper end a horizontally extending ear 60 having an opening extending therethrough and through which extends a guide rod 62. The end of the guide rod 62 remote from that which extends through the ear 60 is pivotally connected at 64 to the fulcrum arm 48 intermediate the ends thereof and threadedly engaging the guide rod 62 adjacent its pivotal connection 64 with the fulcrum arm 48 is a nut 66 against which bears the lower end of a compression coil spring 68, the upper end of which bears against the ear 60 so as to yieldingly urge its respective push bar downwardly within its respective yoke 20. A stop nut 70 threadedly engages the guide rod 62 above the ear 60. Obviously by adjusting the nut 66 on the guide rod 62 the pressure exerted by the spring 68 on the fulcrum arm 48 may be varied.

The structure so far described may be admirably employed in coupling certain types of farm implements to the forward end of a tractor by simply connecting the forward ends of the push bars 22 to the implement. This may be accomplished where the implement couplings are above the normal horizontal positions of the push bars 22 simply by moving the lift arms 12 to rock the push bars 22 about their longitudinal axes which will cause them to move upwardly in the yokes 20 until the desired height has been attained.

With other types of farm implements steadying devices are necessary and accordingly I secure to the plates 40 standards 72 to the upper ends of which are pivoted bifurcated yokes 74 carrying turnbuckles 76 to which are connected yokes 78 which are adapted to be detachably coupled to a farming implement carried by the push bars 22.

In use when it is desired to attach a farming implement to the push bars 22, the lift arms 12 of the tractor are set into motion to exert upward pull on the laterally extending arms 30 of the push bars 22. Such rocking motion of the arms 30 will be transmitted through the push bars 22 to the fulcrum arms 48 which will swing about their respective pivotal connections 50 to move the push bars upwardly in the yokes 20 to the height desired. The farm implement may then be connected to the push bars 22 and upon releasing the lifting effort on the arms 12, it will be evident that the springs 68 will exert downward pressure on the push bars to cause the farming implement to enter the ground under the yielding pressure of the springs 68. Steadying of the implement may be accomplished by coupling the yoke 78 to said implement in spaced relation to the push bar connections and it is obvious that the operation of the implement may be readily accomplished by manipulation of the lift arms 12 of the farm tractor.

While in the foregoing there has been shown and described the preferred embodiment of this invention it is to be understood that minor changes in the details of construction combination and arrangement of parts may be resorted to without departing from the spirit and scope of the invention as claimed.

This is a continuation in part of the co-pending application of Edward Maurer (now deceased), Serial No. 751,419 filed May 29, 1947, now abandoned.

What is claimed is:

1. In a farm tractor of the type having a prime mover, lift arms mounted on said tractor to move in unison in spaced vertical arcuate paths adjacent the rear end of the tractor, and manually actuated means carried by the tractor and operatively connected to the prime mover and to the lift arms for controlling the movements of the lift arms in the arcuate paths, means for coupling a farming implement to the tractor adjacent the forward end thereof for vertical movement by the lift arms, said means comprising elongated push bars carried by the tractor below the lift arms for vertical movement and for rotation about their longitudinal axes, said push bars extending in spaced relation adjacent opposite sides of the tractor and beyond the front end thereof, means carried by the push bars adjacent the rear end of the tractor and connected to the lift arms for rotating the push bars when the lift arms move in their arcuate paths, and means carried by the push bars and connected to the tractor for elevating the forward ends of the push bars when the lift arms move upwardly in their arcuate paths.

2. The structure defined in claim 1 in which the means for rotating the push bars comprises levers carried by the push bars and extending laterally therefrom adjacent the rear ends thereof, and links connected to the levers and to the lift arms for rocking the levers when the lift arms move in their arcuate paths.

3. The structure defined in claim 1 in which the means for elevating the forward ends of the push bars comprises arms carried by the push bars and extending laterally therefrom adjacent the forward ends thereof and means pivotally connecting the arms to the tractor to provide fulcrums about which the push bars move as they rotate about their longitudinal axes.

4. The structure defined in claim 3 in which the means pivotally connecting the arms to the tractor is adjustable vertically relative to the tractor to raise or lower the fulcrums.

5. The structure defined in claim 3 in which the means pivotally connecting the arms to the tractor includes sleeves mounted on the tractor to rock adjacent opposite sides thereof about horizontal axes which lie parallel to the longitudinal axis of the tractor, links extending through the sleeves and pivotally connected to the arms, and nuts threadedly connected to the links and engaging the sleeves to hold the pivotal connections of the links to the arms in selected positions of vertical adjustment.

6. The structure defined in claim 3 in which yielding means are mounted on the tractor above the arms for exerting downward pressure on the arms to yieldingly urge a farming implement carried by the push bars into contact with the earth.

7. The structure defined in claim 3 in which vertically extending columns are carried by the tractor adjacent the arms, ears are carried by the columns adjacent the upper ends thereof and extend laterally therefrom above the arms and compression coiled springs lie between and bear against the ears and the arms for yieldingly urging downwardly a farming implement carried by the forward ends of the push bars.

8. The structure defined in claim 7 in which tie rods extend through the ars and through the coiled springs and are connected to the arms, and nuts are threadedly engaged with the tie rods above the ears for limiting the downward movement of a farming implement carried by the push bars under the influence of the springs.

9. The structure defined in claim 1 in which standards are carried by the tractor adjacent the forward end thereof and longitudinally adjustable links are pivotally connected to the standards above the push bars for pivotal connection to a farming implement carried by the forward ends of the push bars to steady said implement.

10. The structure defined in claim 1 in which the yokes are carried by the tractor adjacent opposite ends thereof for supporting the push bars for rotation and for up and down movement relative to the tractor.

ESTHER MAURER,
*Administratrix of the estate of Edward Maurer, deceased.*

References Cited in the file of this patent
UNITED STATES PATENTS

| Number | Name | Date |
|---|---|---|
| 2,295,898 | Hollis | Sept. 15, 1942 |
| 2,327,853 | Benjamin | Aug. 24, 1943 |
| 2,425,806 | Ing | Aug. 19, 1947 |